(12) United States Patent
Pfaff

(10) Patent No.: US 8,480,161 B2
(45) Date of Patent: Jul. 9, 2013

(54) DRAG REDUCTION APPARATUS FOR A TRAILER

(76) Inventor: Raimund Pfaff, Carter Lake, IA (US)

( * ) Notice: Subject to any disclaimer, the term of this patent is extended or adjusted under 35 U.S.C. 154(b) by 87 days.

(21) Appl. No.: 13/270,634

(22) Filed: Oct. 11, 2011

(65) Prior Publication Data

US 2013/0088040 A1  Apr. 11, 2013

(51) Int. Cl.
*B62D 35/00* (2006.01)
(52) U.S. Cl.
USPC ............................................. 296/180.4
(58) Field of Classification Search
USPC ............................ 296/180.1–180.5
See application file for complete search history.

(56) References Cited

U.S. PATENT DOCUMENTS

| | | | | |
|---|---|---|---|---|
| 3,799,603 A | * | 3/1974 | Bott | 296/180.1 |
| 4,320,920 A | * | 3/1982 | Goudey | 296/180.4 |
| 5,190,343 A | * | 3/1993 | Fischer et al. | 296/180.5 |
| 5,249,836 A | * | 10/1993 | Stanesic et al. | 296/180.1 |
| 5,338,088 A | * | 8/1994 | Stanesic | 296/180.1 |
| 5,382,070 A | * | 1/1995 | Turner | 296/180.1 |
| 5,845,960 A | * | 12/1998 | Koike et al. | 296/180.1 |
| 6,086,146 A | * | 7/2000 | Nabuurs | 296/217 |
| 6,126,229 A | * | 10/2000 | Lund | 296/180.1 |
| 6,193,302 B1 | * | 2/2001 | Won et al. | 296/180.1 |
| 6,224,135 B1 | * | 5/2001 | Rehkopf | 296/91 |
| 6,273,488 B1 | * | 8/2001 | Pike et al. | 296/91 |
| 6,837,536 B1 | | 1/2005 | Schwartz | |
| 6,923,493 B2 | | 8/2005 | Buchholz et al. | |
| 6,979,051 B2 | | 12/2005 | Jones et al. | |
| 7,100,971 B2 | | 9/2006 | Pines | |
| 7,311,351 B1 | * | 12/2007 | Nahm et al. | 296/180.1 |
| 7,422,270 B2 | | 9/2008 | Graaff et al. | |
| 2006/0043770 A1 | * | 3/2006 | Preiss | 296/180.1 |
| 2007/0283646 A1 | | 12/2007 | Ehrlich | |
| 2007/0284913 A1 | | 12/2007 | Ehrlich | |
| 2010/0026045 A1 | * | 2/2010 | Thomas | 296/180.1 |
| 2011/0272965 A1 | * | 11/2011 | Henderson et al. | 296/180.4 |

* cited by examiner

*Primary Examiner* — Lori Lyjak
(74) *Attorney, Agent, or Firm* — Dennis L. Thomte; Thomte Patent Law Office LLC

(57) ABSTRACT

A drag reduction device secured to each of the top rails of a wheeled cargo van body or container which covers the recess formed in the outer side of the top rail.

20 Claims, 6 Drawing Sheets

DRAG REDUCTION APPARATUS FOR A TRAILER

BACKGROUND OF THE INVENTION

1. Field of the Invention

This invention relates to a drag reduction apparatus for a trailer and more particularly to a drag reduction apparatus which is secured to each of the upper side rails of the body of the trailer. Even more particularly this invention relates to a cover member which is secured to each of the upper side rails so as to extend over the recesses in the upper side rails to prevent air flow from entering the recesses.

2. Description of the Related Art

Semi-trailer bodies have a floor with a forward end, a rearward end, a left side and a right side. A front wall extends upwardly from the forward end of the floor, a left wall extends upwardly from the left side of the floor, and a right wall extends upwardly from the right side of the floor. A rear wall including door supporting structure is provided at the rearward end of the floor for supporting one or more doors therein. An elongated left upper side rail is secured to the upper end of the left wall and an elongated right upper side rail is secured to the upper end of the right wall. A forward upper rail is secured to the upper end of the front wall. In some semi-trailer bodies, a rearward upper rail is secured to the upper end of the rear wall. In some cases, curved rail portions join the front ends of the upper side rails to the outer ends of the front upper rail. In some cases, curved rail portions join the rear ends of the upper side rails to the outer ends of the rear upper rail. A roof is secured to the upper rails and extends therebetween.

In many trailers, the upper side rails have a recess portion formed therein at the outer side thereof. Air flow impinging in the recessed portions of the upper rails will create an aerodynamic drag which will have an impact on the fuel consumption of the truck pulling the trailer. The recessed portion in the front upper rail does not pose any appreciable aerodynamic drag since drag reduction devices are commonly mounted on the roof of the truck to cause the airflow to pass upwardly over the front upper rail. However, in some cases, the drag reduction devices on the cab roof do not prevent air flow from impinging into the recessed portion of the front upper rail. Further, since most trucks and trailers are subjected to cross winds, air flow will be impinged into the side upper rails into the recessed areas thereby creating an aerodynamic drag having an impact on the fuel consumption of the truck.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A drag reduction apparatus is disclosed for a trailer having an elongated, horizontally extending upper side rail at the upper end of each of the side walls of the trailer with the upper rail having an elongated, horizontally extending recess formed therein which receives a side edge of a roof member having upper and lower sides. In some trailer bodies, the edges of the roof do not extend into the recessed portions of the top rails. Those designs also suffer from the same drag problems as the upper rails wherein the roof edges extend into the recessed portions of the top rails. The drag reduction apparatus of this invention comprises an elongated, horizontally extending cover member having an upper inner end and a lower outer end. The upper inner end of the cover member is secured to the upper side of the roof member. The lower outer end of the cover member is secured to the upper rails so that the cover member extends over the recess in the upper rails to prevent air flow from entering the recesses thereof.

The cover member is preferably comprised of plastic, aluminum, fiberglass or other suitable material and preferably comes in 12-foot sections. The drag reduction apparatus may be factory installed or retrofitted onto existing trailers.

Therefore, it is a principal object of the invention to provide a drag reduction device for a trailer.

A further object of the invention is to provide a drag reduction device which covers the elongated horizontally extending recess in the upper rails of the trailer.

A further object of the invention is to provide a device of the type described which may be factory installed or which may be retrofitted onto an existing trailer.

A further object of the invention is to provide a device of the type described which is easily affixed to the trailer.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 1:
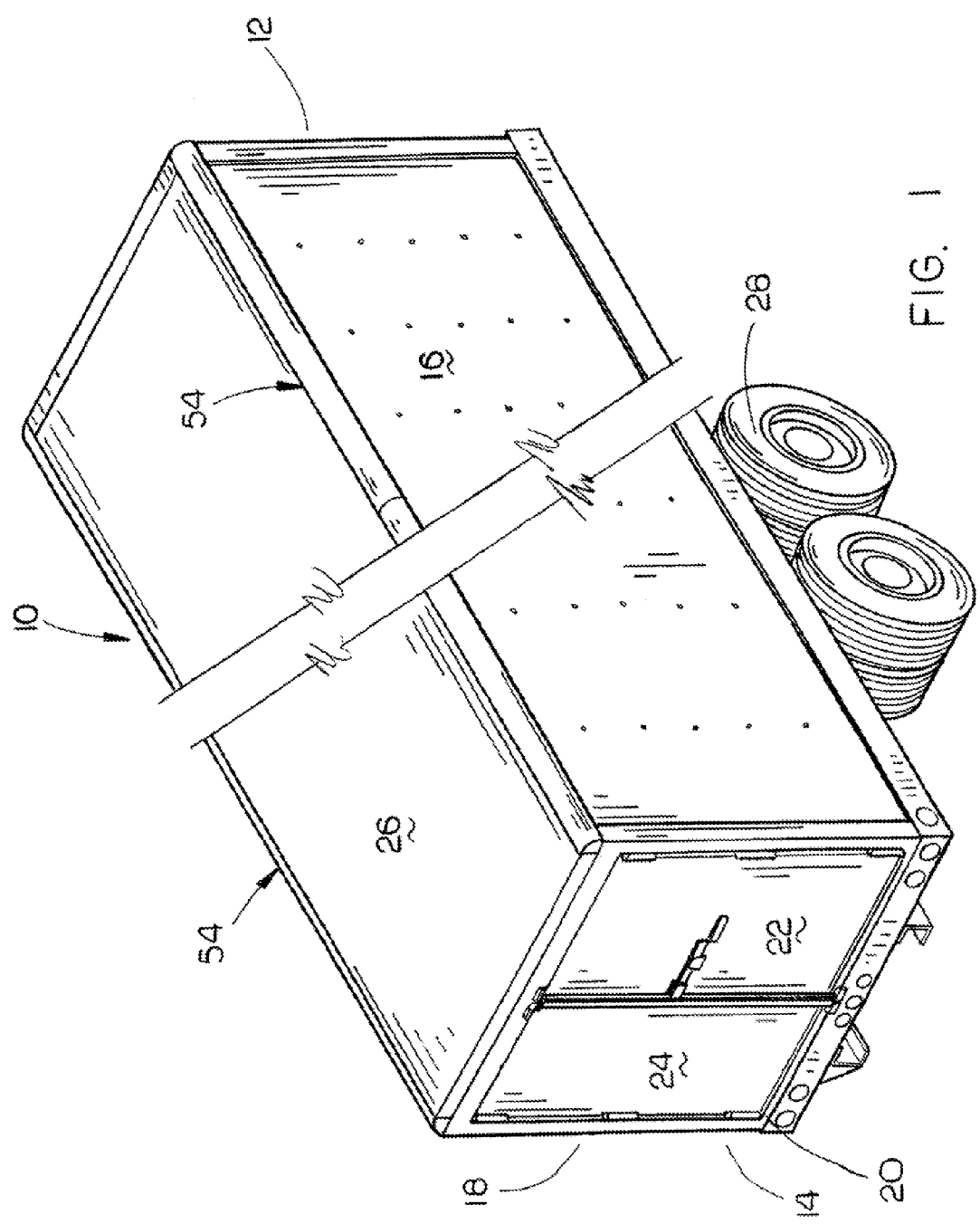
FIG. 1 is a partial perspective view of a conventional semi-trailer having the top side rails covered with the drag reduction apparatus of this invention.

In FIG. 1, the numeral 10 refers to a conventional semi-trailer having a forward end 12, a rearward end 14, a right side wall 16, a left side wall 18, a rear wall 20 having doors 22 and 24 mounted therein, a roof 26, and a wheel assembly 28 which may be of the single axle style or the tandem axle style shown in FIG. 1.

Figure 3:
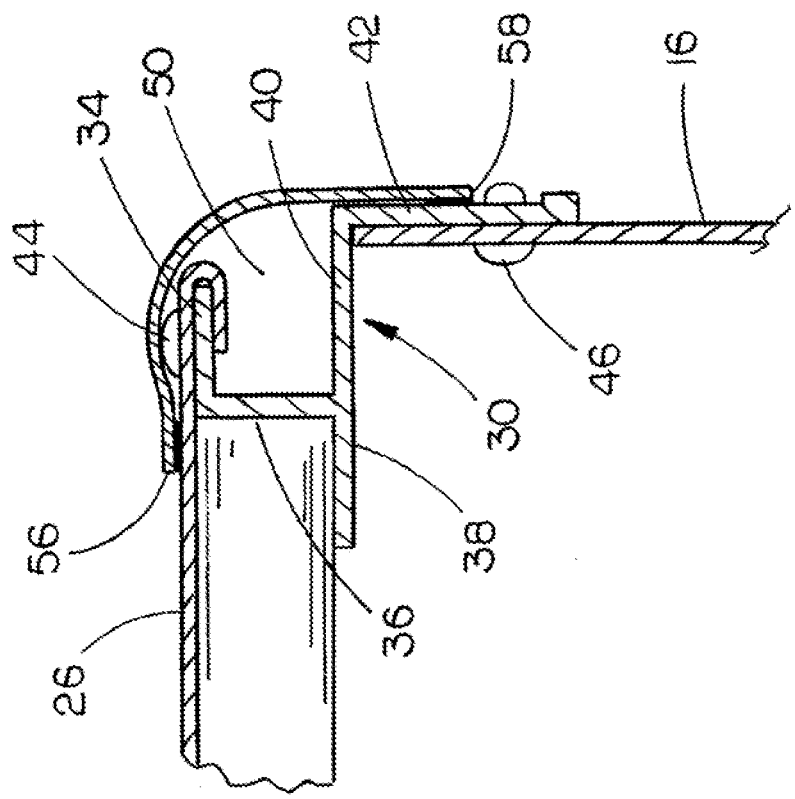
FIG. 3 is a sectional view of one form of the top upper rail commonly used on trailers.
Figure 4:
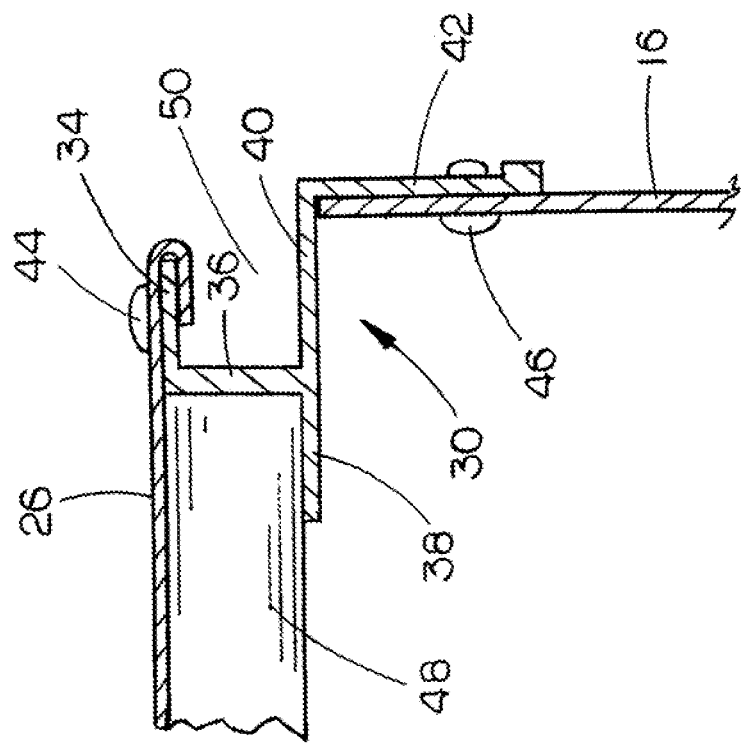
FIG. 4 is a sectional view illustrating the drag reduction apparatus of this invention extending over the top side rail of FIG. 3.
Figure 5:
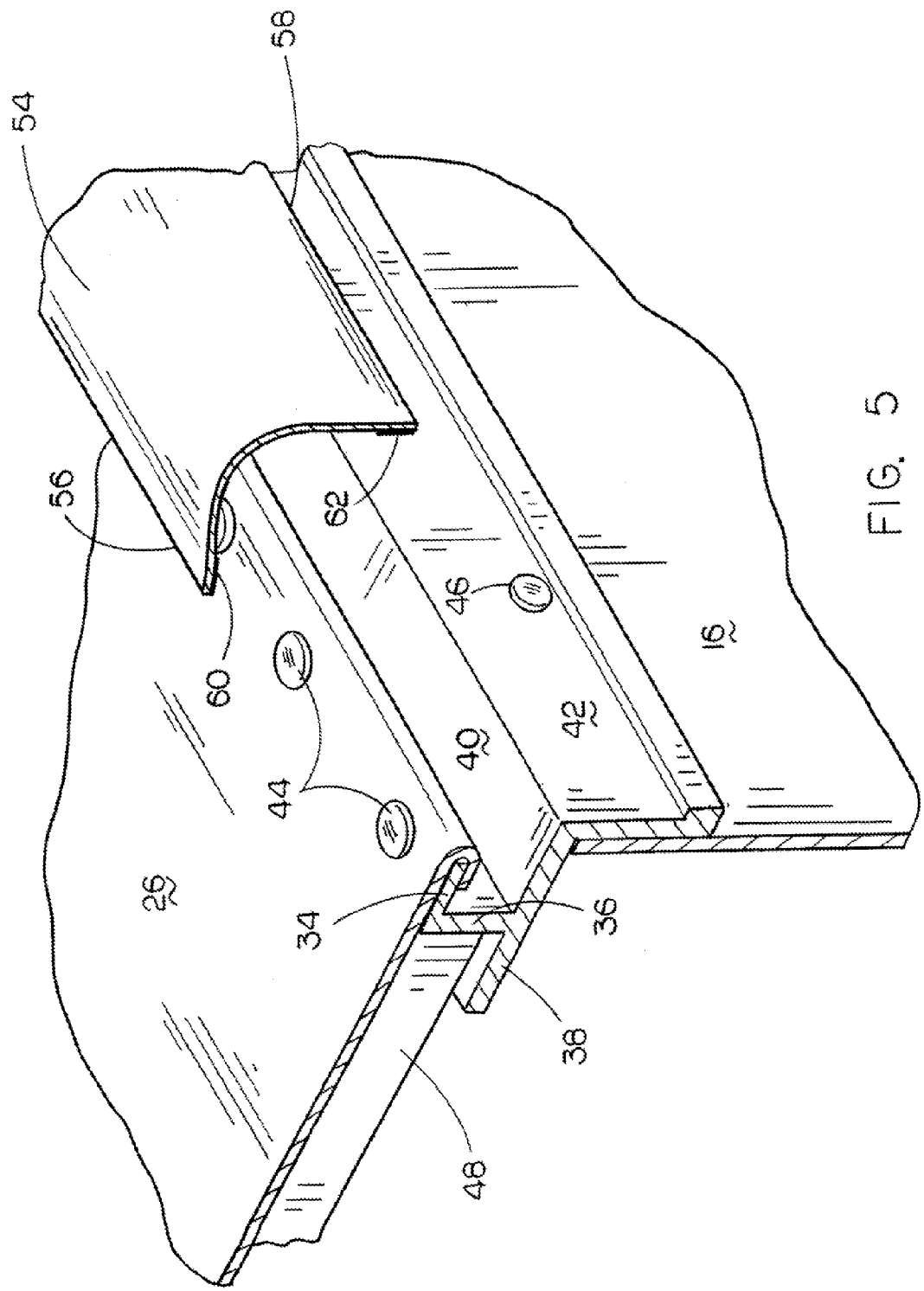
FIG. 5 is a partial perspective view illustrating the drag reduction apparatus of this invention extending over top side rail of FIG. 3.
Figure 7:
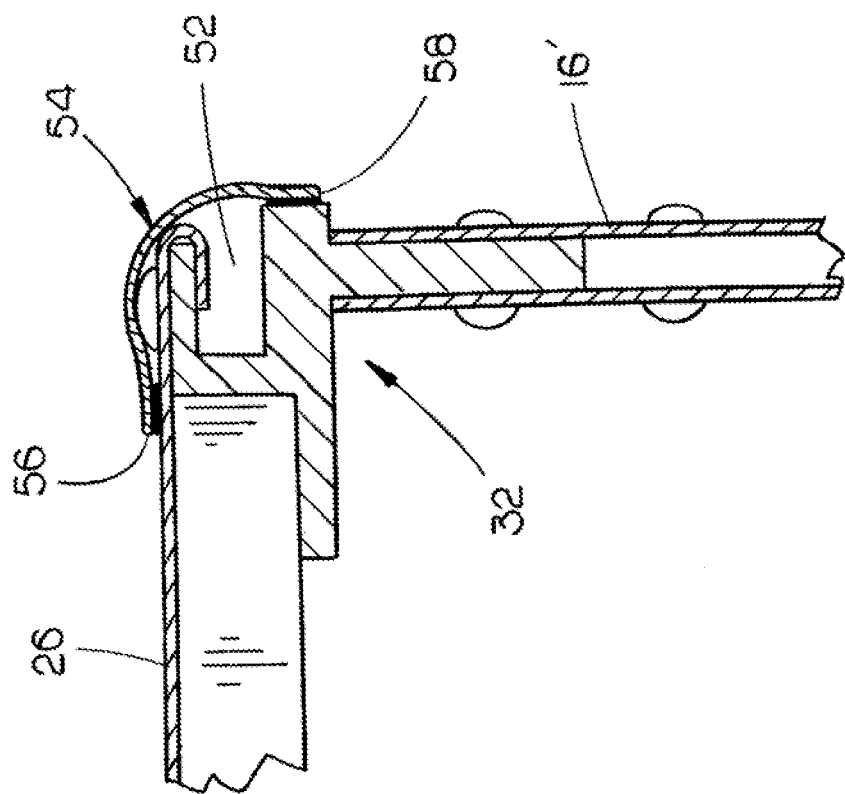
FIG. 7 is a view similar to FIG. 4 except that the drag reduction apparatus of this invention is attached to the top side rail in the configuration of FIG. 6.
Figure 6:
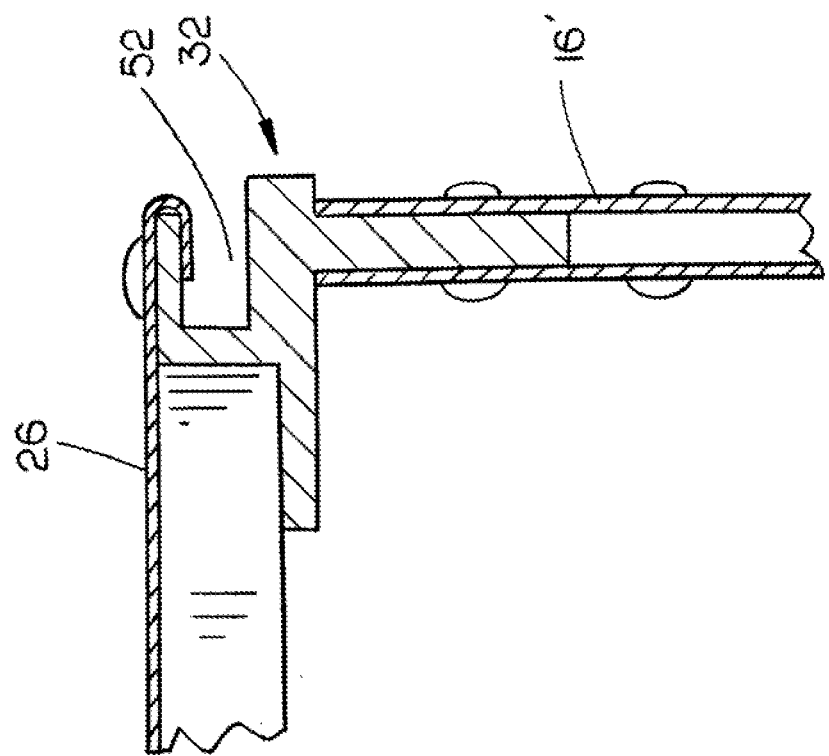
FIG. 6 is a sectional view similar to FIG. 3 except that it shows a different form of a top side rail of a trailer.
Figure 8:
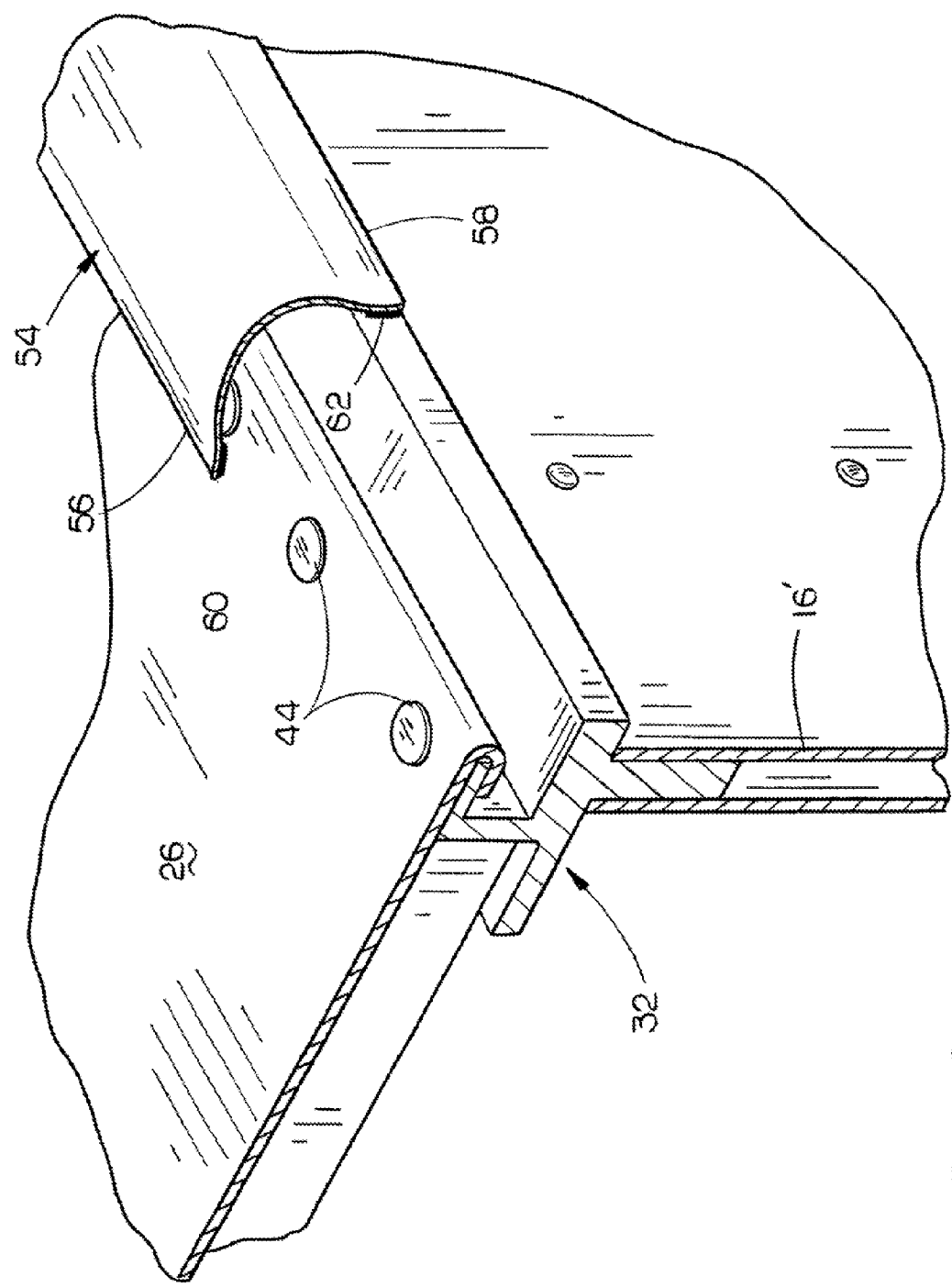
FIG. 8 is a partial perspective view similar to FIG. 5 except that the drag reduction apparatus of this invention is shown to be extending over the top side rail in the configuration of FIG. 6.

Each of the side walls 16 and 18 have a top or upper rail secured thereto which connects the side wall to the roof. FIGS. 3-5 illustrate one form of the top side rails such as found on trailers manufactured by Great Dane Limited Partnership with the top side rail being designated by the reference numeral 30. FIGS. 6-8 illustrate another style of the top side rail which is designated by the reference numeral 32.

Top side rail 30 extends along the upper end of side wall 16 for the length thereof. Top side rail 30 includes an upper horizontally disposed member 34, a vertically disposed member, a horizontally extended member 38, which extends inwardly from the lower end of member 36, a horizontally extending member 40 which extends outwardly from the lower end of member 36, and a vertically extending member 42 which extends downwardly from the outer end of member 40. As seen in FIG. 3, the side edge of roof 26 extends around the outer end of member 34. A longitudinally extending row of rivets 44 extend through roof 26 and member 34 to connect the roof 26 to the top side rail 30. A longitudinally extending row of rivets 46 extend through side wall 16 and member 42 to connect the side wall 16 to top side rail 30. The ends of cross members 48 are supported upon the member 38 as seen in FIG. 3. The configuration of top side rail 30 creates a recess 50 which extends the length of the top rail 30. As the trailer is pulled by a truck, cross winds create an air flow into the recess 50 thereby creating an aerodynamic drag which impacts the full consumption of the truck. If the truck is driving into a head wind, the air flow will enter the recess in the top front rail.

Top rail 32 is similar to top rail 34 except for the fact that the side wall 16' is a double skin side wall. The rail 32 has a recess 52 at its outer side which presents the same drag as recess 50 in the top rail 30.

A top side rail identical to top side rail 32 (not shown) is secured to the upper end of left side wall 18. further, in most trailer designs, a front top rail is secured to the upper end of the front wall of the trailer. Also, in some cases, a top rear rail is secured to the upper end of the rear wall 20. Additionally, the forward ends of the top side rails are joined to the outer ends of the front top rail by curved rail sections. The same is also true for the juncture of the outer ends of the rear top rail and the rear ends of the top side rails.

Applicant has designed a drag reduction apparatus or device 54 to prevent air flow from cross winds from impinging into the recess 50 of top rail 30 and from impinging into the recess 52 of top rail 32. The device 54 will also be secured to the outer top rails as well as the curved corners thereof. Device 54 is elongated and arcuate or curved as seen in the drawings and is preferably constructed of plastic, aluminum, fiberglass or other suitable material. Preferably, device 54 is fabricated in 12-foot lengths so that four of the segments may be joined together for a 48-foot top rail. If the trailer is 53 feet long, four 12-foot lengths will be joined together with a 5-foot segment being cut from a 12-foot segment to create a length of 53 feet.

For purposes of description, device 54 will be described as having an upper inner edge 56 and a lower outer edge. If the device 54 is being used to cover the recess 50 of top rail 30, the upper inner edge 56 is secured to the upper surface of roof 26 by a suitable adhesive 60 or the like. The lower outer edge 58 is secured to the outer surface of member 42 of top rail 30 by a suitable adhesive 62 or the like. When the device 54 is positioned as shown and described, the device 54 prevents cross-wind air flow into recess 50 thereby reducing the drag resistance of the top rail 30. If desired, the lower outer edge 58 of device 54 could be secured to the outer surface of wall 16 below the lower end of top rail 30.

Figure 2:
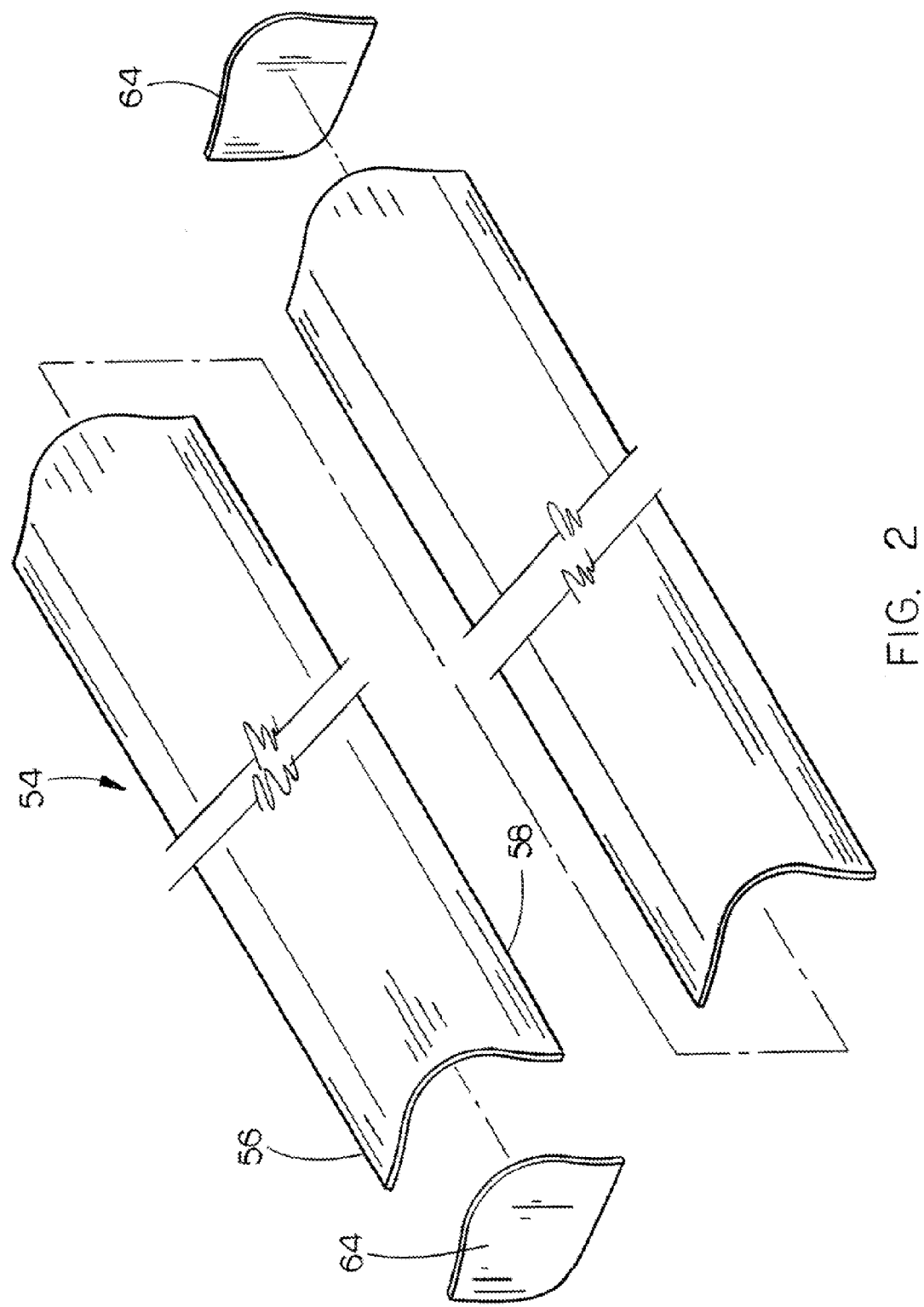
FIG. 2 is a partial perspective view of the drag reduction apparatus of this invention which illustrates two of the sections thereof and the manner in which they are connected together.

When the device 54 is being used with a top side rail 32, the lower outer edge 58 is secured to the top rail 32 as seen in FIGS. 7 and 8 to cover the recess 52 to reduce the aerodynamic drag of the top rail 32. If desired, the lower outer edge 58 of device 54 could be secured to the outer surface of wall 16 at the upper end thereof. The ends of the device 54 should be closed with caps 64, as seen in FIG. 2, or with curved cover sections.

The device 54 of this invention may be factory installed or installed on existing trailers. The device 54 will work equally well with the upper side rails of a van or cargo body of a straight truck. Thus, it can be seen that the drag reduction device of this invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A drag reduction apparatus for a wheeled cargo container having an elongated, horizontally extending top rail at the upper end of one of the side walls of the container with the top rail having an elongated, horizontally extending recess formed therein which receives a side edge of a roof member, having upper and lower sides, comprising:
    an elongated, horizontally extending cover member having an upper inner end and a lower outer end;
    said upper inner end of said cover member being secured to the upper side of the roof member;
    said lower outer end of said cover member being secured to the top side rail so that said cover member extends over the recess in the top rail to prevent cross-wind air flow from entering the recess.

2. The apparatus of claim 1 wherein said upper inner end of said cover member is adhesively secured to the roof member.

3. The apparatus of claim 1 wherein said lower outer end of said cover member is adhesively secured to the top rail.

4. The apparatus of claim 1 wherein said lower outer end of said cover member is secured to the top rail below the recess thereof.

5. The apparatus of claim 1 wherein said cover member has an arcuate profile.

6. The apparatus of claim 1 wherein said cover member is comprised of a metal material.

7. The apparatus of claim 1 wherein said cover member is comprised of a plastic material.

8. The apparatus of claim 1 wherein said cover member is comprised of a fiberglass material.

9. The apparatus of claim 1 wherein said cover member is comprised of an aluminum material.

10. The apparatus of claim 1 wherein the container is a trailer.

11. A drag reduction apparatus for a wheeled cargo container having an elongated, horizontally extending top rail at the upper end of one of the side walls of the container with the top rail having an elongated, horizontally extending recess formed therein which receives a side edge of a roof member, having upper and lower sides, comprising:
- an elongated, horizontally extending cover member having an upper inner end and a lower outer end;
- said upper inner end of said cover member being secured to the upper side of the roof member;
- said lower outer end of said cover member being secured to the outer side of the side wall so that said cover member extends over the recess in the top side rail to prevent cross-wind air flow from entering the recess.

12. The apparatus of claim 10 wherein said upper inner end of said cover member is adhesively secured to the roof member.

13. The apparatus of claim 11 wherein said lower outer end of said cover member is adhesively secured to the side wall.

14. The apparatus of claim 11 wherein said lower outer end of said cover member is secured to the side wall below the recess in the top rail.

15. The apparatus of claim 11 wherein said cover member has an arcuate profile.

16. The apparatus of claim 11 wherein said cover member is comprised of a metal material.

17. The apparatus of claim 11 wherein said cover member is comprised of a plastic material.

18. The apparatus of claim 11 wherein said cover member is comprised of a fiberglass material.

19. The apparatus of claim 11 wherein said cover member is comprised of an aluminum material.

20. A drag reduction apparatus for a wheeled cargo container having an elongated, horizontally extending top rail at the upper end of one of the walls of the container with the top rail having an elongated, horizontally extending recess formed therein with an edge of a roof member, having upper and lower sides, being secured to the top rail, comprising:
- an elongated, horizontally extending cover member having an upper inner end and a lower outer end;
- said upper inner end of said cover member being secured to the upper side of the roof member;
- said lower outer end of said cover member being secured to the outer side of associated wall so that said cover member extends over the recess in the top rail to prevent air flow from entering the recess.

* * * * *